United States Patent
Muraki

(10) Patent No.: US 7,830,361 B2
(45) Date of Patent: Nov. 9, 2010

(54) HAPTIC INTERFACE SYSTEM FOR VIDEO SYSTEMS

(75) Inventor: Yosuke Muraki, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 742 days.

(21) Appl. No.: 11/694,702

(22) Filed: Mar. 30, 2007

(65) Prior Publication Data

US 2008/0238937 A1    Oct. 2, 2008

(51) Int. Cl.
G09G 5/00    (2006.01)
(52) U.S. Cl. .................. 345/156; 345/157; 345/161
(58) Field of Classification Search ......... 345/156–184; 463/36–37
See application file for complete search history.

(56) References Cited

U.S. PATENT DOCUMENTS

| | | | |
|---|---|---|---|
| 6,424,333 B1 * | 7/2002 | Tremblay et al. .......... | 345/156 |
| 6,979,164 B2 * | 12/2005 | Kramer .................. | 414/5 |
| 2006/0092133 A1 * | 5/2006 | Touma et al. ............ | 345/158 |
| 2008/0055248 A1 * | 3/2008 | Tremblay et al. .......... | 345/158 |
| 2008/0158149 A1 * | 7/2008 | Levin .................... | 345/156 |

FOREIGN PATENT DOCUMENTS

WO    2006015335 A1    2/2006

OTHER PUBLICATIONS

Crossan, Andrew, "The Design and Evaluation of a Haptic Veterinary Palpation Training Simulator", Thesis Submitted for the degree of Doctor of Philosophy, University of Glasgow, Dec. 2003.
Ottensmeyer, M. P. and Salisbury, J. K., "Hot and cold Running VR: adding thermal stimuli to the haptic experience", Proceedings of the Second PHANToM Users Group Workshop, Massachusetts Institute of Technology, Dec. 1997.
Kyung, Ki-Uk, et al., "A Novel Interactive Mouse System for Holistic Haptic Display in a Human-Computer Interface", International Journal of Human-Computer Interaction, 20(3), 247-270.

* cited by examiner

Primary Examiner—Nitin Patel
(74) Attorney, Agent, or Firm—Mikio Ishimaru

(57) ABSTRACT

A haptic interface system is presented including manipulating a haptic controller having an accelerometer; programming a video system processor for responding to moving the accelerometer of the haptic controller; and activating a haptic response device by the video system processor for updating the haptic controller including heating, cooling, illuminating, or a combination thereof.

20 Claims, 6 Drawing Sheets

HAPTIC INTERFACE SYSTEM FOR VIDEO SYSTEMS

TECHNICAL FIELD

The present invention relates generally to video system interfaces, and more particularly to a system for providing contextual feedback based on the media active on a video system.

BACKGROUND ART

People are constantly interacting with computerized systems, from the trivial (e.g., the computerized toaster or the remote control television) to the exceedingly complex (e.g., telecommunications systems and the Internet). An advantage of computerization is that such systems provide flexibility and power to their users. However, the price that must be paid for this power and flexibility is, typically, an increase in the difficulty of the human/machine interface.

A fundamental reason for this problem is that computers operate on principles based on the abstract concepts of mathematics and logic, while humans tend to think in a more spatial manner. Often people are more comfortable with physical, three-dimensional objects than they are with the abstractions of the computer world. In short, the power and flexibility provided by the computer and related electronic technology are inherently limited by the ability of the human user to control these devices. Since people do not think like computers, interfaces are adopted to permit people to effectively communicate with computers. In general, better interfaces permit more efficient and medium independent communications between people and computers. The better interface will provide the user a natural and intuitive communication with the computer without sacrificing the computer's potential.

A haptic interface is one that utilizes the sense of touch to communicate a condition or response. Virtual reality simulators may use the haptic interface driven by a computer system in order to simplify the interaction between a computer and the person operating the simulator. The goal of such a system may be to educate the operator to the subject of the simulation. In this case the simulator creates a feeling in the operator that matches some real world parameters, but is completely driven by the computer system.

In the world of video games, the human/machine interface has been very rudimentary. Simply providing a way to control the central figure, while the computer program sorts through possible actions based on the user input and the current state of the program is the norm. As consumers become more demanding and sophisticated, moving a character around may become quite tedious. In order to maintain user participation and involvement, game developers have improved the graphic rendering of the video games, the content has many more options that could be activated by the user, and feedback to the user may come from sources other than the screen and the speakers.

While this approach delivers some short-term success, the user still only has the option of moving the central character through the predetermined set of possible actions. The developers of video games have not yet found a simple way to draw the game player closer to a virtual reality provided by the video game.

Other applications such as personal video players rely on the ever-changing play list to maintain the interest of their users. Many of these devices become short-lived fads that lose the interest of consumers as the next wave of devices hit the market. An enhancement is needed to add another dimension of involvement between the user and the device, whether it be the personal video player or the video game.

Thus, a need still remains for a haptic interface system for video systems. In view of the increasing popularity of video devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a haptic interface system including manipulating a haptic controller having an accelerometer; programming a video system processor for responding to moving the accelerometer of the haptic controller; and activating a haptic response device by the video system processor for updating the haptic controller including heating, cooling, illuminating, or a combination thereof.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
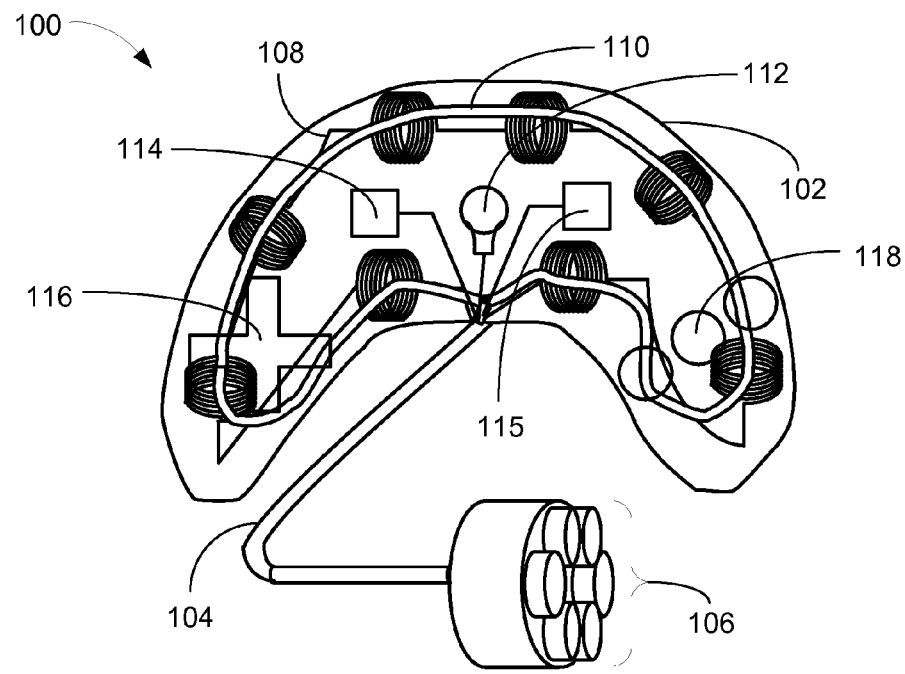
FIG. 1 is a plan view of a haptic interface system for video systems, in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the platform on which the video system resides, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane. The term "on" means there is direct contact among elements. The term "system" as used herein means and refers to the method and to the apparatus of the present invention in accordance with the context in which the term is used. The term "processing" as used herein includes stamping, forging, patterning, exposure, development, etching, cleaning, and/or removal of the material or laser trimming as required in forming a described structure.

Referring now to FIG. 1, therein is shown a plan view of a haptic interface system 100 for video systems, in an embodiment of the present invention. The plan view of the haptic interface system 100 depicts a controller 102, such as a video game controller, having an interconnect link 104, and a video system connector 106. The controller 102 may have a heating system 108, a cooling system 110, a light source 112, and an accelerometer 114. There may also be a thermal sensing device 115, such as a thermometer, a thermocouple, or a thermostat, a directional button 116 and activation keys 118.

The thermal sensing device 115 may be calibrated during the loading of a video game. The range of temperature change must be within a safe range for the player. This range is established by setting an absolute temperature limit for hot and cold. The video game may read the range information from the thermal sensing device in order to calibrate the range used by the video game. The resulting calibration may determine the duration of heating or cooling for each scene. A typical video game may have 30 to 40 scenes displayed per second.

During the operation of a video game, the operator would grip the controller 102 and manipulate a game function with the direction button 116 and the activation keys 118. The program receives the operator input through the interconnect link 104 and may, as a result of that input, activate the heating system 108, the cooling system 110, the light source 112, or a combination thereof. The light source 112 is shown as a single bulb, but this is an example only. The light source 112 may actually be multiple sources of differing colors or a single source capable of producing several colors.

Figure 2:
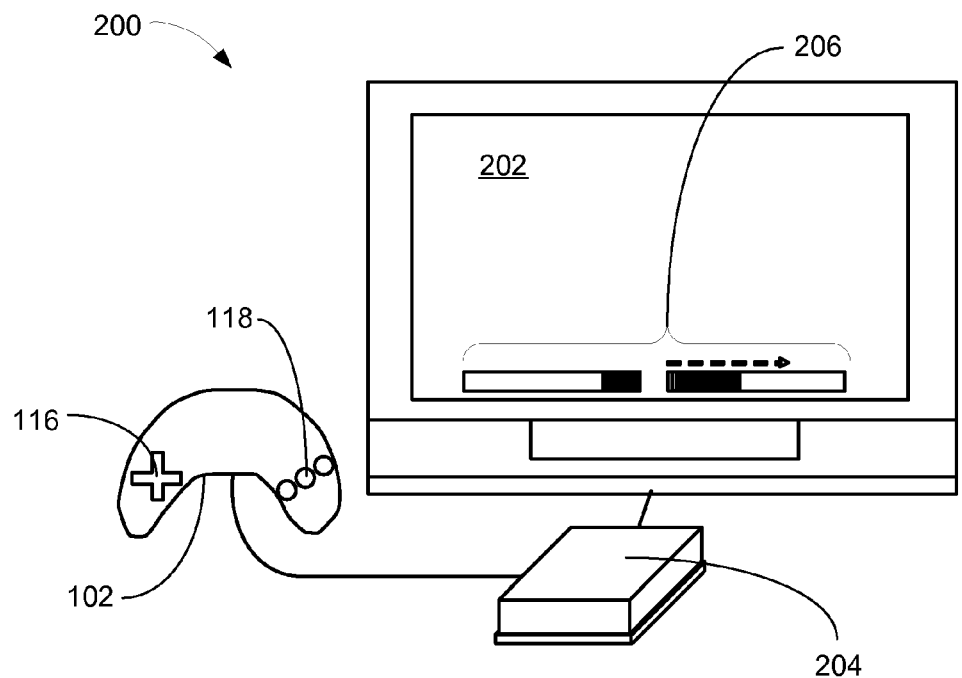
FIG. 2 is a system level view of a video game having the haptic interface system.

Referring now to FIG. 2, therein is shown a system level view of a video game 200 having the haptic interface system. The system level view of the video game 200 depicts a monitor 202 used for displaying the video game (not shown), a video system 204, such as a video gaming system, and the controller 102.

The player (not shown) provides input to the video system 204 through the controller 102. In prior art systems, a strength or energy level would be indicated on the monitor 202 in the form of a gauge 206 that is displayed on the monitor 202. This may also be the case with the present invention, though there is a unique aspect of the present invention not present in the prior art devices. While the gauge 206 may display an energy level within the game, the video system 204 captures an ambient temperature form the scene within the game and adds an activity related temperature for the player. The video system 204 conveys the player total temperature to the controller 102. The controller 102 then heats or cools to the appropriate level for the scene and the player activity. As an added aspect of the present invention, the light source 112 of FIG. 1 illuminates the controller 102 in a color that is appropriate for the game temperature.

The gauge 206 may be elevated by accessing one of the activation keys 118 of FIG. 1, the direction button 116 of FIG. 1, by accelerating the controller 102 in a direction, or by activating a game feature. All of the gauge 206 interpretation is done by the video system 204. The video system 204 then conveys the temperature and color intensity information to the controller 102. The gauge 206 on the screen serves as a visual calibration of the temperature experienced by the player holding the controller 102.

Figure 3:
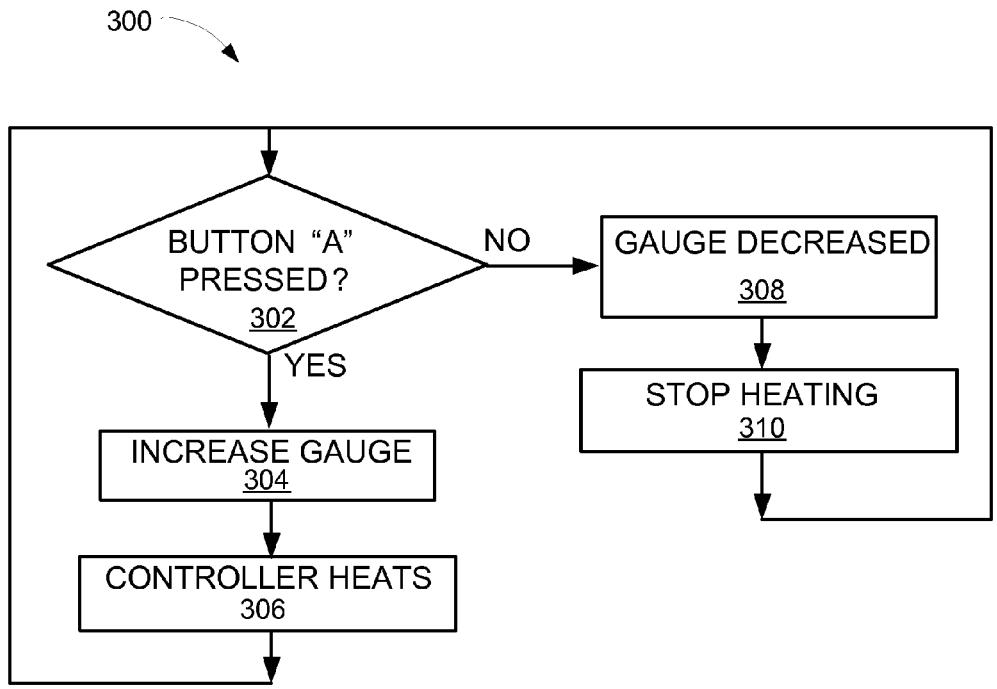
FIG. 3 is a flow chart of the haptic interface system operation using a gauge.

Referring now to FIG. 3, therein is shown a flow chart of a haptic interface system operation 300 using a gauge. The flow chart of the haptic interface system operation 300 depicts a decision branch 302 coupled to an increase gauge block 304, coupled to a controller heats block 306 and returns to the decision branch 302. If the button "A" is not being pressed, the flow chart steps to a gauge decreased block 308 which is coupled to a stop heating block 310 the output of the stop heating block 310 is coupled back to the decision block 302.

The decision block 302 determines whether the correct one of the activation keys 118 is being pressed or the accelerometer 114 detects sufficient motion of the controller 102 to increase the gauge 206 and therefore the temperature of the controller 102. As the controller 102 heats it also changes color. The controller 102 may be a first color, such as red, when the temperature is hot, and a second color, such as blue, when the temperature is cold. The color linked to the temperature further supports the relationship of the controller 102 to the character in the video game.

Figure 4:
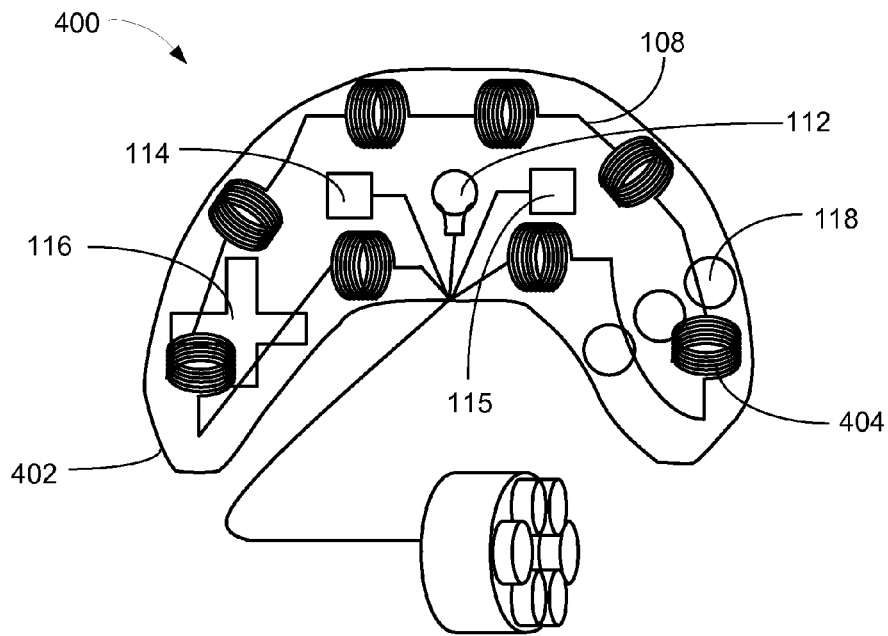
FIG. 4 is a plan view of the haptic interface system heating system.

Referring now to FIG. 4, therein is shown a plan view of a haptic interface system heating system 400, in an embodiment of the present invention. The plan view of the haptic interface system heating system depicts a controller casting 402 having the directional button 116 of FIG. 1 and activation keys 118 of FIG. 1. The heating system 108 has a heating device 404, such as a heating coil, distributed within the controller casting 402.

As the video game is played, the video system 204 of FIG. 2 may activate the heating system 108 in order to reflect the activity in the video game. The light source 112 of FIG. 1 may be adjusted for color and intensity to compliment the temperature of the controller casting 402. The input devices include the thermal sensing device 115, the direction button 116, the activation keys 118 and the accelerometer 114. These input devices interact with the video game at the player's discretion and may raise or lower the temperature of the controller casting 402 as a result of the program response. The thermal sensing device 115 supplies the temperature of the controller casting 402 to the video game.

The heating device 404 is shown as a coil but it is understood that this is an example and actually the heating device 404 used in the implementation may be a semiconductor resistive device, a semiconductor logic device, a discrete resistive component, a discrete inductive component, or a combination thereof. The heating device 404 may be mounted inside the controller casting 402 with the heating device 404 on the controller casting 402.

Figure 5:
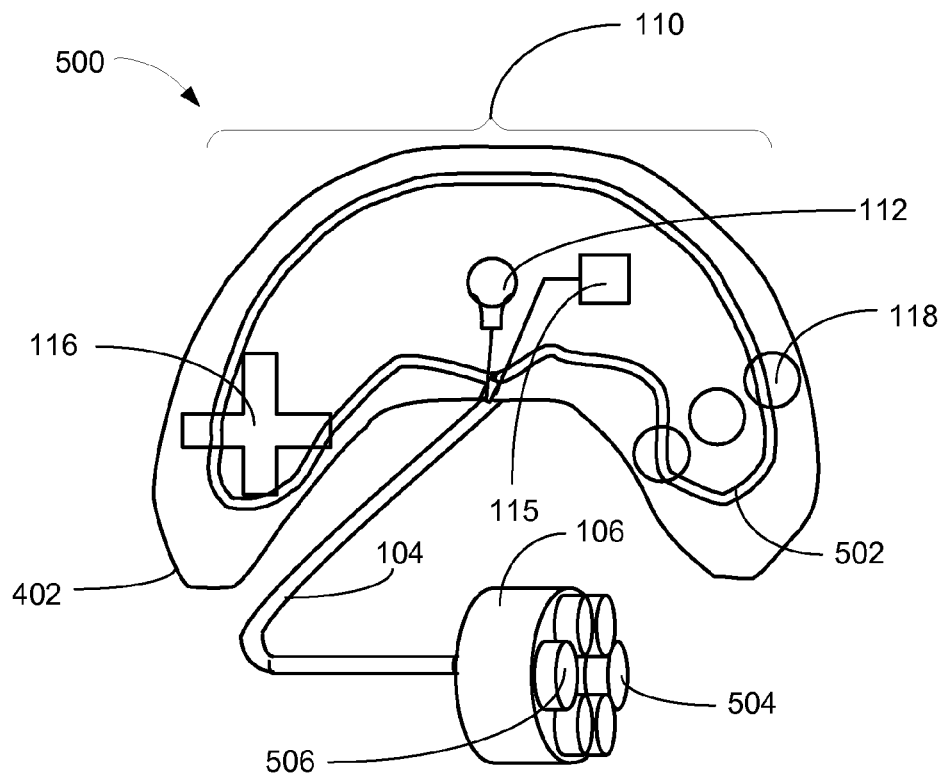
FIG. 5 is a plan view of the haptic interface system cooling system.

Referring now to FIG. 5, therein is shown a plan view of the haptic interface system cooling system 500. The plan view of the haptic interface system cooling system 500 depicts the controller casting 402 of FIG. 4 having the thermal sensing device 115, the direction button 116 of FIG. 1 and the activation keys 118 of FIG. 1. The cooling system 110 of FIG. 1 has a cooling capillary 502 that runs through the inside of the controller casting 402. The cooling capillary 502 is mounted on the controller casting 402 and runs through the interconnect link 104 of FIG. 1 to the video system connector 106 of FIG. 1. The video system connector 106 has an input coupling 504 and an output coupling 506.

During the operation of the video game, the player may access functions in the program that reduces the temperature of the environment. In this case a refrigerant is pumped through the input coupling 504, the cooling capillary 502, and the output coupling 506. When the refrigerant cools the controller casting 402, the light source 112 may be activated to illuminate the controller casting 402 with a cooler color, such as green or blue. The input coupling 504 and the output coupling 506 may be in any position in the video system connector 106 and the positions used in the drawing are for example only.

In an alternative construction, the cooling capillary 502 may be implemented with a Peltier cooling device. This device will allow one of its surfaces to be chilled while the other surface is heated. This heat pump effect may provide sufficient cooling to match the cold activities displayed in the video system 204.

Figure 6:
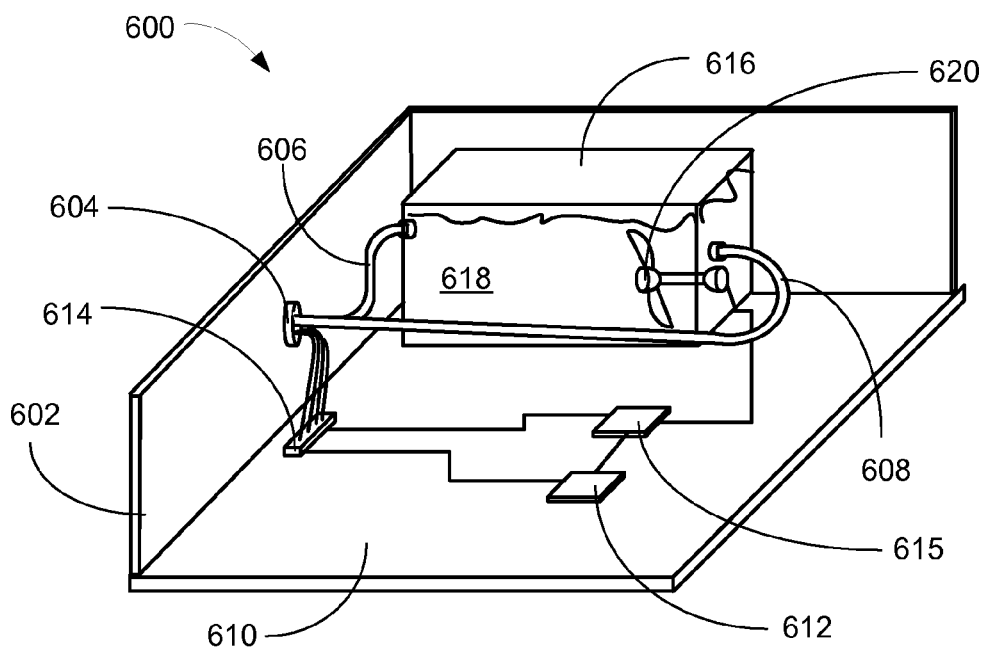
FIG. 6 is a cut-away view of a video system having a cooling pump mounted therein.

Referring now to FIG. 6, therein is shown a cut-away view of a video system 600 having a cooling pump mounted therein. The cut-away view of the video system 600 depicts a chassis 602 for housing an interconnect link adapter 604, a refrigerant source 606, and a refrigerant return 608. A printed circuit board 610, having a video system processor 612, is coupled to the interconnect link adapter 604 through an electrical connector 614. The video system processor 612 receives the input signals from the controller 102 of FIG. 1 and based on the program execution may activate a haptic response device 615. The haptic response device 615 may activate the heating device 404 of FIG. 4 in the controller 102 of FIG. 1.

The haptic response device 615 may also be coupled to a cooling pump 616. The cooling pump 616 is also coupled to the interconnect link adapter 604 by the refrigerant source 606 and the refrigerant return 608. The cooling pump 616 contains a refrigerant 618, such as refrigerated water, compressed gas like Freon or carbon dioxide ($CO_2$), or some other fluid refrigerant. A refrigerant compressor 620 may be activated by the video system processor 612 in order to lower the temperature of the controller 102 of FIG. 1 based on the response from the video game. When appropriate, the refrigerant 618 is pumped into the refrigerant source 606 and allowed to pass through the controller 102. The refrigerant 618 returns to the video system 600 by entering the refrigerant return 608 to flow back into the cooling pump 616.

The haptic response device 615 may manipulate the temperature of the controller 102 in response to the video system processor 612 executing the video game program and receiving the input signals from the direction button 116 of FIG. 1, the activation keys 118 of FIG. 1, the accelerometer 114 of FIG. 1, or a combination thereof. The haptic response device 615 may activate the heating device 404 or the cooling pump 616 in short intervals of time. This allows the controller 102 to heat or cool gradually in response to the video game program. The haptic response device 615 may also activate the light source 112 for illuminating the controller 102 with an appropriate color of light to match the temperature associated with the current scene of the video game.

Figure 7:
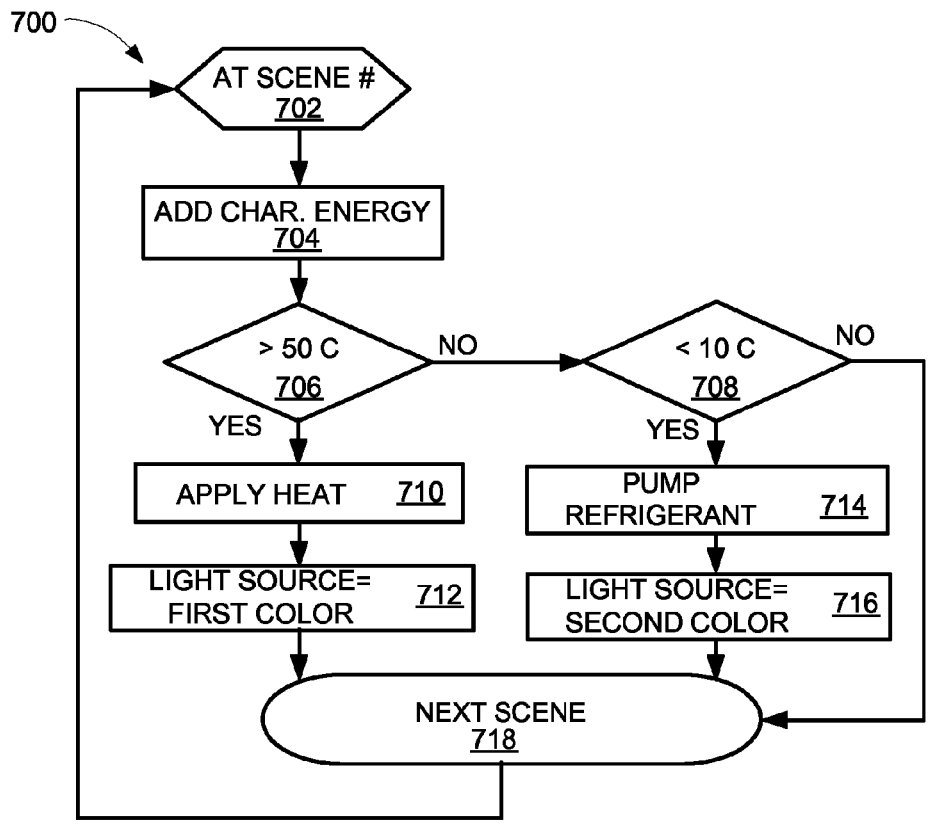
FIG. 7 is a flow chart of a program for operating the haptic interface system using video game scene information.

Referring now to FIG. 7, therein is shown a flow chart of a program 700 for operating the haptic interface system 100 using video game scene information. The flow chart of the program 700 includes a scene entry 702, in which a scene temperature parameter is captured, coupled to a add character energy block 704. The add character energy block 704 may use the gauge 206 of FIG. 2 in combination with the reading of the accelerometer 114 of FIG. 1 to calculate a character energy that is added to the scene temperature to determine the total scene temperature.

The add character energy block 704 is coupled to a greater than 50° C. decision block 706. If the total scene temperature is greater than 50° C. the flow proceeds to an apply heat block 710. The apply heat block 710 activates the heating system 108 of FIG. 1. By applying a current to the heating system 108, the temperature of the controller 102 of FIG. 1 increases. The current is applied for a unit of time which allows the controller 102 to increase in temperature without becoming a danger.

The flow proceeds to a light source equals first color block 712 in which the light source 112 of FIG. 1 is incrementally shifted toward a first color, such as red. The shift may require several scenes having a high temperature, such as a temperature greater than 50° C., in order to display the first color from the controller 102. The flow then proceeds to a next scene block 718, in which the parameters for the next scene are fetched by the video system processor 612 of FIG. 6. The flow then proceeds to the scene entry 702.

In the event the greater than 50° C. decision block 706 does not detect a total temperature greater than 50° C., the flow proceeds to a less than 10° C. decision block 708. If the less than 10° C. decision block 708 does detect that the total scene temperature is a less than 10° C., the flow proceeds to a pump refrigerant block 714. The pump refrigerant block 714 activates the cooling pump 616 of FIG. 6 and forces the refrigerant 618 of FIG. 6 through the controller 102. The refrigerant 618 is pumped incrementally through the controller 102. The result is a transition of the temperature across several scenes.

The flow proceeds to a light source equals second color block 716. The light source equals second color block 716 is incrementally shifted toward a second color, such as blue. The shift may require several scenes having a low temperature, such as a temperature less than 10° C., in order to display the second color from the controller 102. The flow then proceeds a next scene block 718, in which the parameters for the next scene are fetched by the video system processor 612. The flow then proceeds to the scene entry 702. If the less than 10° C. decision block 708 does not detect that the total scene temperature is a less than 10° C., the flow proceeds to the next scene block 718.

Figure 8:
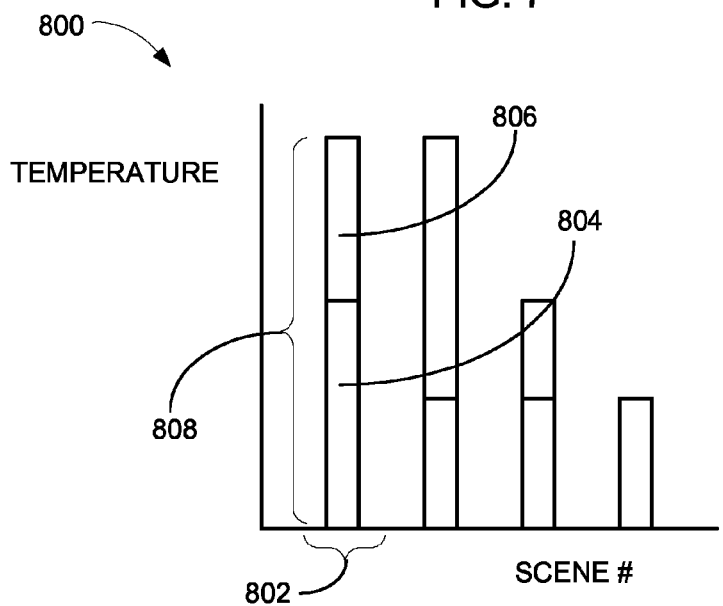
FIG. 8 is a graph of a temperature of the haptic interface system based on game operation.

Referring now to FIG. 8, therein is shown a graph of a temperature of the haptic interface system 100 based on game operation. The graph of temperature has a horizontal axis representing the individual scenes and a vertical axis representing temperature. While executing a video game a scene 802 is encountered having a scene ambient temperature 804.

During the scene 802 the character has a character energy 806 that is added to the scene ambient temperature 804 to form the total scene temperature 808.

In some instances, the scene ambient temperature 804 may decrease relative to the previous scene without decreasing the total scene temperature 808. The character energy 806 is independent of the scene ambient temperature 804 and may increase or decrease based on the character's activity level. In some cases the character may be in a quiescent state that allows the character energy 806 to go to zero leaving only the scene ambient temperature 804 as the total scene temperature 808.

Figure 9:
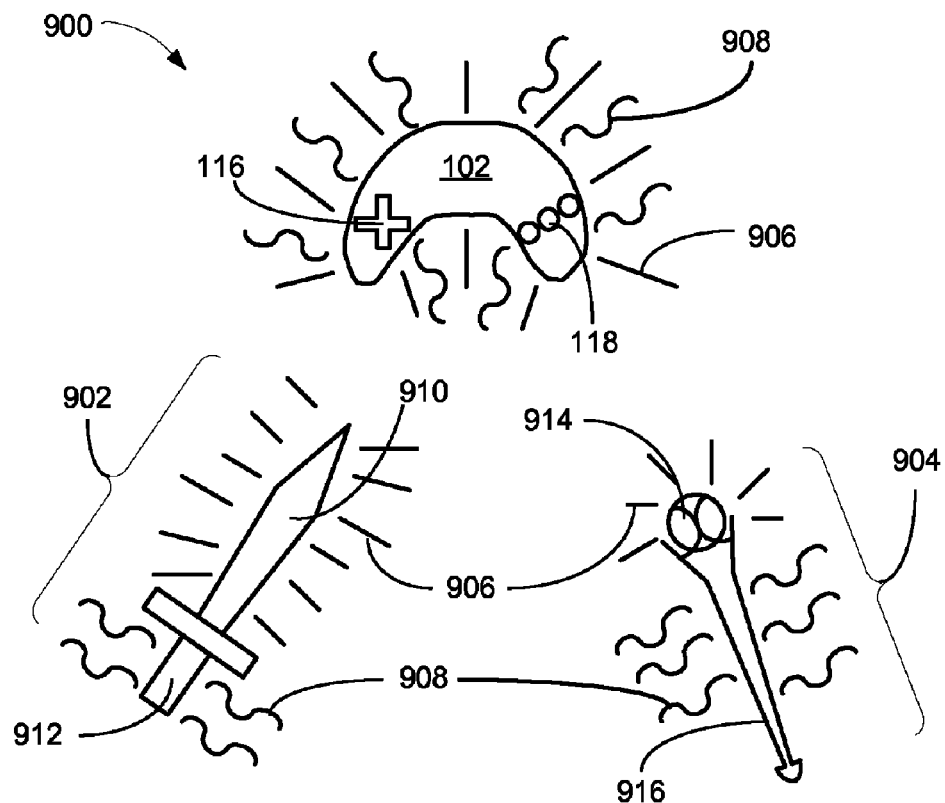
FIG. 9 is a top view of haptic interface system controllers, in an embodiment of the present invention.
Figure 9:
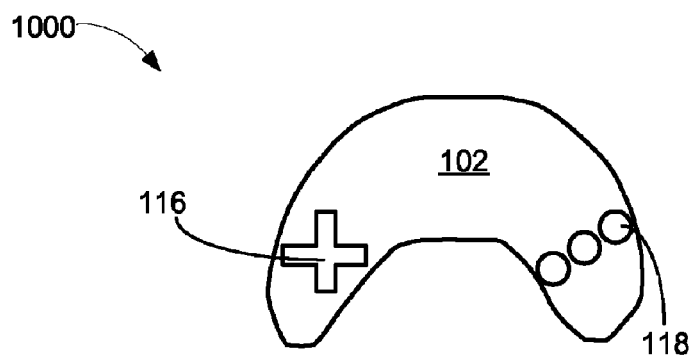

Referring now to FIG. 9, therein is shown a top view of haptic interface system controllers 900, in an embodiment of the present invention. The top view of the haptic interface system controllers 900 depicts the controller 102 of FIG. 1, a sword controller 902, and a wand controller 904. The controller 102 may have a banana shape with the direction button 116 and the activation keys 118. The direction button 116, the activation keys 118, and the accelerometer 114 of FIG. 1 are the input devices for the controller. The controller 102 also has output characteristics that differentiate it from prior art devices, the controller 102 may be illuminated by a light source 112 in a color that reflects the temperature of the character in the video game. The controller 102 may also get hot or cold in response to the activity in the video game. The emission of a light 906 and a temperature 908 draw the player closer into the activity of the video game.

The sword controller 902 may have activation keys 118 and an accelerometer 114 as input devices. The sword controller 902 may emit a light 906 from a blade 910 and a temperature 908 from a hilt 912.

The wand controller 904 may have activation keys 118 and an accelerometer 114 as input devices. The wand controller may emit the light 906 from a crystal 914 and the temperature 908 form a staff 916. During the execution of the video game, the light 906 and the temperature 908 may reflect the activities in the video game in order to enhance the experience of the game player.

Figure 10:
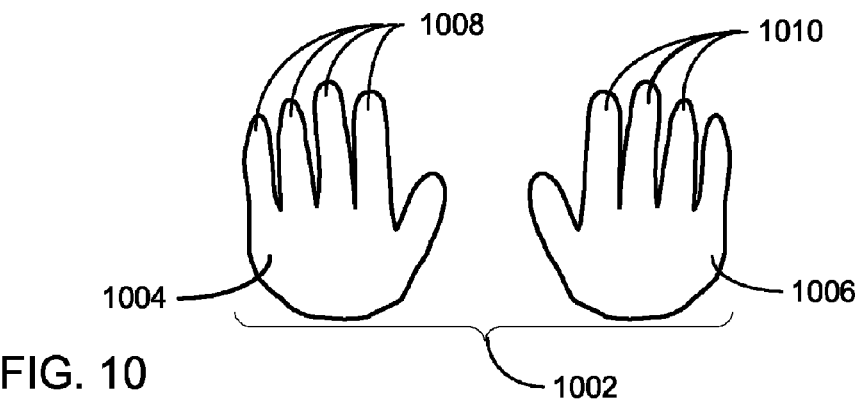
FIG. 10 is a top view of two embodiments of the haptic interface system for video systems.

Referring now to FIG. 10, therein is shown a top view of an embodiment of a haptic interface system 1000 for video systems. The top view of the embodiment of the haptic interface system 1000 depicts the controller 102 of FIG. 1 having a direction button 116 of FIG. 1 and activation keys 118 of FIG. 1 as a reference example for a controller glove pair 1002. The functions of the controller 102 are replicated in the controller glove pair 1002. A first glove 1004, such as a left glove, may contain the same function as the direction button 116 of FIG. 1. A finger 1008 may contain sensors that supply input information such as up, down, left, right. A second glove 1006, such as a right glove 1006, may have a digit 1010 containing switches that replicate the function of the activation key 118.

The controller glove pair 1002 may supply haptic feedback to the player by heating, cooling, and illuminating an appropriate color for the temperature of the scene of a video game. The player may activate an accelerometer 114 of FIG. 1 in the first glove 1004 and the second glove 1006 in order to interact with the video system 304 of FIG. 2. The controller glove pair 1002 may allow the player to experience a close involvement with the video game execution, thus drawing the player into a virtual reality with the video game.

Figure 11:
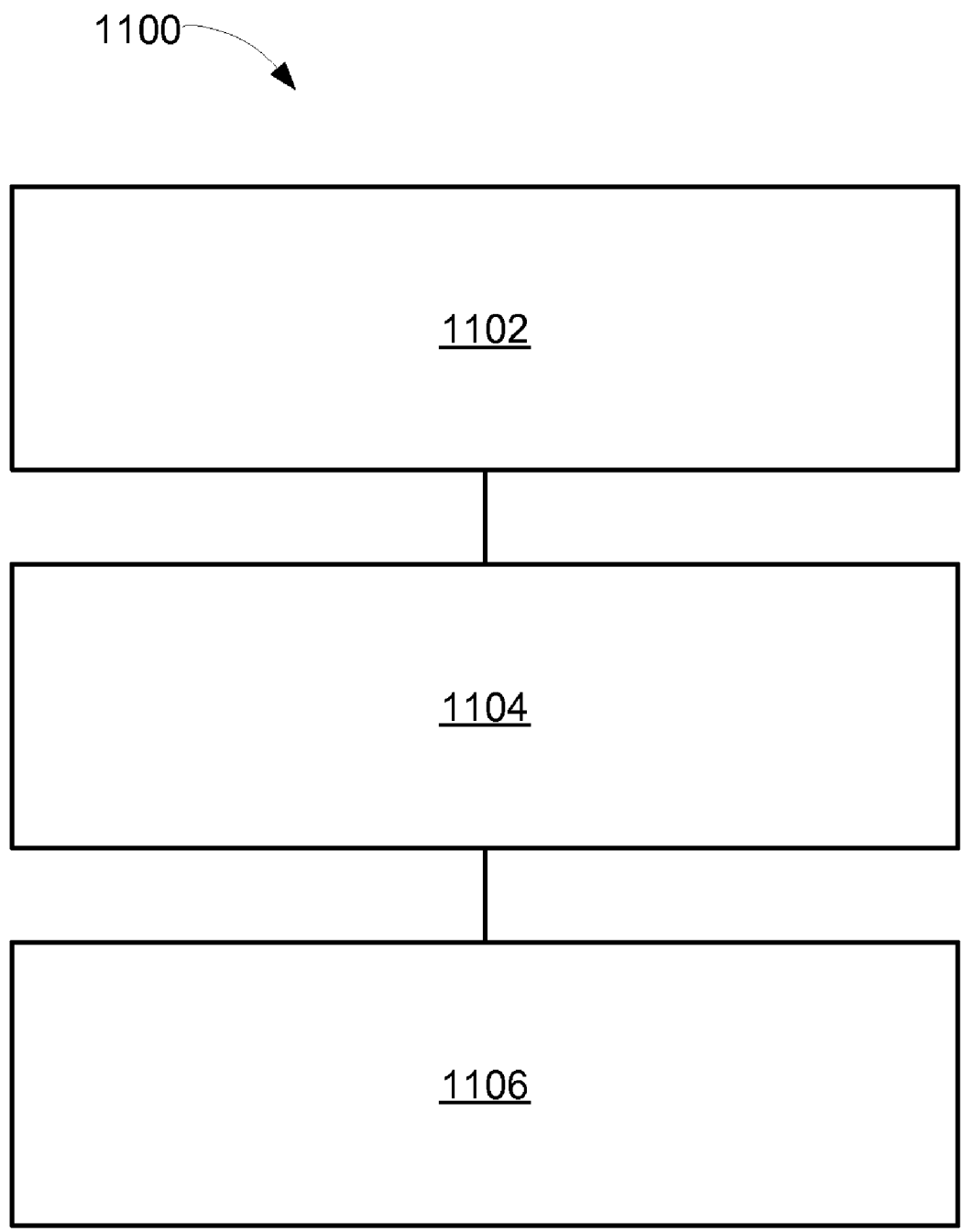
FIG. 11 is a flow chart of the operation of the haptic interface system for video systems in an embodiment of the present invention.

Referring now to FIG. 11, therein is shown a flow chart of a haptic controller interface system 1100 for operating the haptic controller interface 100 for a video system in an embodiment of the present invention. The system 1100 includes manipulating a haptic controller having an accelerometer in a block 1102; programming a video system processor for responding to moving the accelerometer of the haptic controller in a block 1104; and activating a haptic response device by the video system processor for updating the haptic controller including heating, cooling, illuminating, or a combination thereof in a block 1106.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operating a haptic interface system comprising:

manipulating a haptic controller having an accelerometer, a direction button, and activation keys;

programming a video system processor for responding to moving the accelerometer of the haptic controller, activating the direction button, pushing one of the activation keys, or a combination thereof for operating the video system processor program; and activating a haptic response device by the video system processor for updating the haptic controller including heating, cooling, illuminating, or a combination thereof.

2. The method as claimed in claim 1 wherein activating the haptic response device includes powering a heating device, pumping a refrigerant, illuminating a light source, or a combination thereof.

3. The method as claimed in claim 1 further comprising:

loading a program in the video system processor;

executing the program by monitoring the haptic controller; and managing a temperature and a light of the haptic controller by the program.

4. The method as claimed in claim 1 further comprising powering a heating device for elevating a temperature of the haptic controller by the haptic response device.

5. The method as claimed in claim 1 further comprising selecting a light source for illuminating the haptic controller by the haptic response device.

6. A method of operating a haptic interface system comprising:

manipulating a haptic controller having an accelerometer, a direction button, and activation keys for detecting a movement of the haptic controller;

programming a video system processor for responding to moving the accelerometer of the haptic controller, activating the direction button, pushing one of the activation keys, or a combination thereof for operating the video system processor program; and activating a haptic response device by the video system processor for updating the haptic controller including heating, cooling, illuminating, or a combination thereof in which the video system processor includes executing a program for managing the haptic response device.

7. The method as claimed in claim 6 wherein activating the haptic response device includes powering a heating device, pumping a refrigerant, illuminating a light source, or a combination thereof in which illuminating the light source includes having a first color for hot and a second color for cold.

8. The method as claimed in claim 6 further comprising:

loading a program in the video system in which the program includes a video game;

executing the program by monitoring the haptic controller includes playing the video game; and managing a temperature and a light of the haptic controller by the program includes determining a light and a temperature by the video game.

9. The method as claimed in claim 6 further comprising powering a heating device for elevating a temperature of the haptic controller by the haptic response device including activating a cooling pump for lowering the temperature of the haptic controller.

10. The method as claimed in claim 6 further comprising selecting a light source for illuminating the haptic controller by the haptic response device including causing the haptic controller to be a first color when hot or a second color when cold.

11. A haptic interface system comprising:

a haptic controller having an accelerometer, a direction button, and activation keys;

a video system processor programmed to respond to the accelerometer movement, the direction button activated, one of the activation keys pushed or a combination thereof in the haptic controller; and a haptic response device activated by the video system processor for updating the haptic controller by heating, cooling, illuminating, or a combination thereof.

12. The system as claimed in claim 11 further comprising an interconnect link adapter coupled to the haptic response device.

13. The system as claimed in claim 11 wherein the haptic controller includes a controller, a controller glove pair, a sword, a wand, or a combination thereof.

14. The system as claimed in claim 11 further comprising a heating device for elevating a temperature of the haptic controller by the haptic response device.

15. The system as claimed in claim 11 further comprising a light source for illuminating the haptic controller by the haptic response device.

16. The system as claimed in claim 11 wherein the haptic response device is coupled to a heating system, a cooling system, and a light source.

17. The system as claimed in claim 16 further comprising an interconnect link adapter coupled to the haptic response device in which the interconnect link adapter is coupled to a refrigerant source and a refrigerant return.

18. The system as claimed in claim 16 wherein the haptic controller includes a controller, a controller glove pair, a sword, a wand, or a combination thereof coupled to the video system processor by an interconnect link.

19. The system as claimed in claim 16 further comprising a heating device for elevating a temperature of the haptic controller by the haptic response device in which the heating device is mounted on a controller casting.

20. The system as claimed in claim 16 wherein the light source for illuminating the haptic controller by the haptic response device includes the light source having more than one color.

* * * * *